US012591672B2

(12) United States Patent
Sharpe

(10) Patent No.: US 12,591,672 B2
(45) Date of Patent: Mar. 31, 2026

(54) SYSTEMS AND METHODS FOR PERFORMING NON-BINARY CLASSIFICATION DURING SEQUENCE MINING

(71) Applicant: Capital One Services, LLC, McLean, VA (US)

(72) Inventor: Samuel Sharpe, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 70 days.

(21) Appl. No.: 18/419,488

(22) Filed: Jan. 22, 2024

(65) Prior Publication Data

US 2025/0238510 A1     Jul. 24, 2025

(51) Int. Cl.
*G06F 21/00* (2013.01)
*G06F 21/56* (2013.01)

(52) U.S. Cl.
CPC ................................. *G06F 21/566* (2013.01)

(58) Field of Classification Search
None
See application file for complete search history.

(56) References Cited

U.S. PATENT DOCUMENTS

| | | | | | |
|---|---|---|---|---|---|
| 5,729,223 | A | * | 3/1998 | Trissel | G06T 9/005 |
| | | | | | 341/51 |
| 11,531,818 | B2 | * | 12/2022 | Kim | G06F 40/216 |

| | | | | | |
|---|---|---|---|---|---|
| 11,715,042 | B1 | * | 8/2023 | Liu | G06N 3/006 |
| | | | | | 705/26.1 |
| 11,775,641 | B2 | * | 10/2023 | Vasilenko | G06N 3/09 |
| | | | | | 726/23 |
| 2010/0293175 | A1 | * | 11/2010 | Vadrevu | G06F 16/951 |
| | | | | | 707/754 |
| 2015/0172303 | A1 | * | 6/2015 | Humble | H04L 63/1408 |
| | | | | | 726/23 |
| 2019/0205761 | A1 | * | 7/2019 | Wu | G06F 16/353 |
| 2022/0147629 | A1 | * | 5/2022 | Vasilenko | G06F 21/566 |
| 2023/0259624 | A1 | * | 8/2023 | Hassanain | G06F 21/566 |
| | | | | | 726/23 |
| 2023/0315844 | A1 | * | 10/2023 | Roytman | G06F 16/353 |
| | | | | | 726/23 |
| 2024/0176673 | A1 | * | 5/2024 | Roseberg | G06F 9/5061 |

* cited by examiner

*Primary Examiner* — Maung T Lwin

(74) *Attorney, Agent, or Firm* — Foley & Lardner LLP

(57) ABSTRACT

Systems and methods recite a system that expands the available amount of data that may be used for training and/or detecting cyber fraud. In particular, as opposed to limiting training data (and/or successful matches) to patterns of text strings in electronic communications of user records, the systems and methods additionally generate training data (and/or successful matches) on the characteristics of the text strings themselves (e.g., the specific characters used, the length, the uniqueness of the text string, etc.). Moreover, the systems and methods may determine particular rules that an identified text string and/or characteristics thereof violates. The system may then use instances of the identified text string, characteristics thereof, and/or violated rule to supplement existing training data. Thus, the systems and methods mitigate the technical problem related to the limited training data.

20 Claims, 4 Drawing Sheets

<u>400</u>

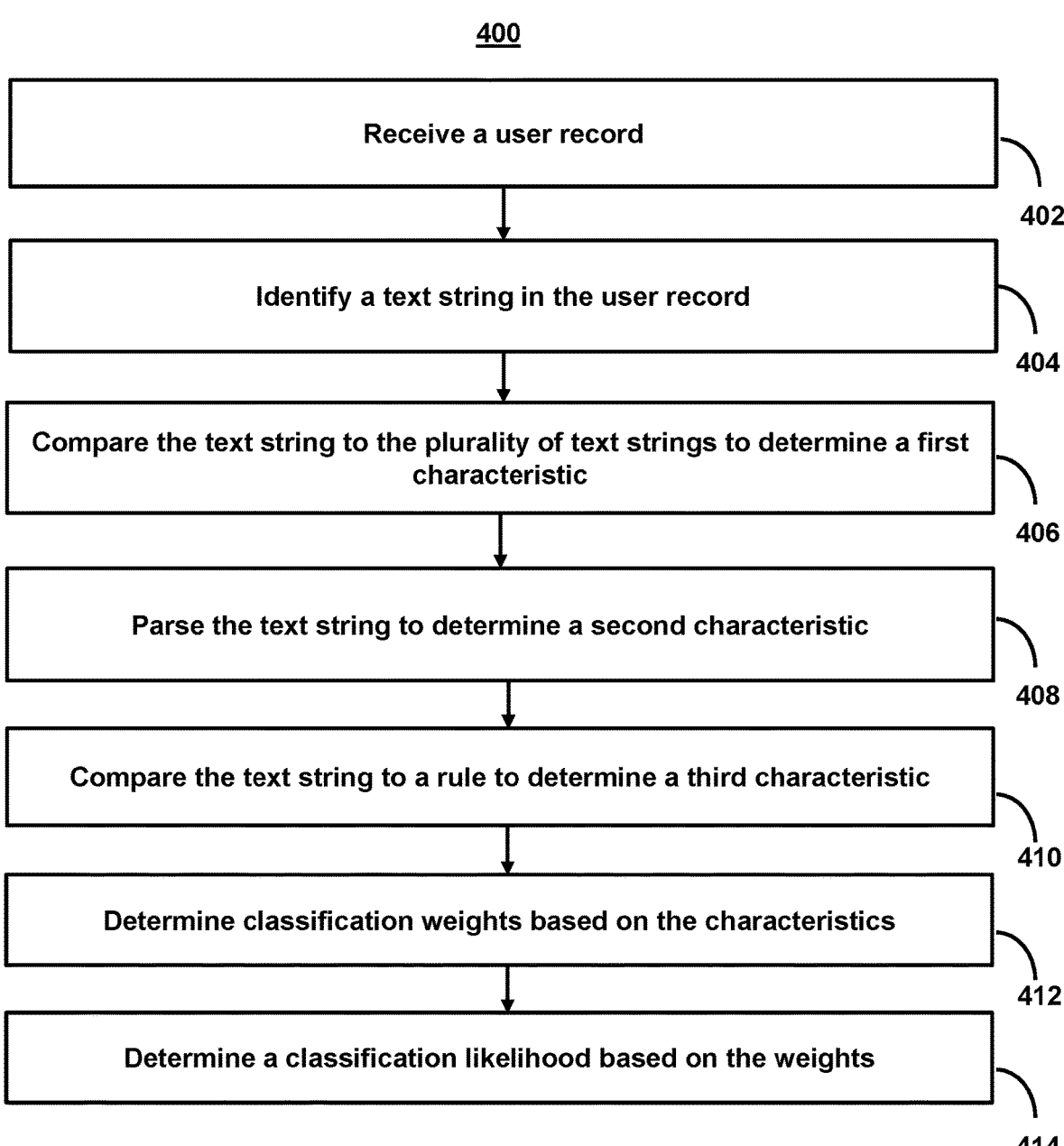

Receive a user record

402

Identify a text string in the user record

404

Compare the text string to the plurality of text strings to determine a first characteristic

406

Parse the text string to determine a second characteristic

408

Compare the text string to a rule to determine a third characteristic

410

Determine classification weights based on the characteristics

412

Determine a classification likelihood based on the weights

SYSTEMS AND METHODS FOR PERFORMING NON-BINARY CLASSIFICATION DURING SEQUENCE MINING

BACKGROUND

Cyber fraud refers to any fraudulent or deceptive activity conducted through the use of digital means, typically over the internet. It involves the unauthorized and unlawful acquisition of sensitive information, such as personal data, financial details, or intellectual property, with the intention of deceiving individuals, companies, or organizations for financial gain or other malicious purposes. There are various types of cyber fraud, including phishing (e.g., sending fraudulent emails or messages that appear to be from reputable sources to trick individuals into revealing personal information like passwords, credit card numbers, or bank account details), identity theft (e.g., stealing someone's personal information, such as social security numbers, dates of birth, or addresses, to impersonate them and commit fraudulent activities, credit card fraud (e.g., illegally using someone's credit or debit card information to make unauthorized purchases or transactions), etc.

Cyber fraud is difficult to stop because cyberattacks feature constantly evolving tactics, using advanced techniques and technologies to bypass security measures. Cyberattacks often employ sophisticated methods like social engineering, encryption, and malware that can be challenging to detect and counteract. Additionally, the sheer volume of cyberattacks is overwhelming. Automated tools and bots enable cybercriminals to launch numerous attacks simultaneously, targeting multiple individuals or organizations. Finally, new vulnerabilities, malware, and hacking techniques emerge regularly. Cybersecurity experts must keep up with these evolving threats and vulnerabilities, requiring constant updates to security measures and software.

SUMMARY

Systems and methods are described herein for novel uses and/or improvements to artificial intelligence applications for use in preventing and/or mitigating cyberattacks and/or cyber fraud. As one example, systems and methods are described herein for performing non-binary classification during sequence mining.

In order to combat the sophisticated methods, sheer volume, and constantly evolving vulnerabilities, malware, and/or hacking techniques of cyberattacks in real-time. The systems and methods disclosed herein describe using sequence mining to identify indicia of cyberattacks in real-time. For example, sequence mining is a data mining technique used to discover sequential patterns, relationships, and/or regularities within a dataset containing sequences or ordered events. It involves the extraction of interesting patterns or sequences from sequential data, such as time-stamped transactions, DNA sequences, web clickstreams, user behaviors, etc. The primary goal of sequence mining is to identify frequently occurring patterns or sequences that can provide valuable insights or knowledge about the underlying data.

Sequence mining alone is not sufficient in order to combat the technical challenges of the sophisticated methods, sheer volume, and constantly evolving vulnerabilities, malware, and/or hacking techniques of cyberattacks because sequence mining relies on identifying matches in electronic communications that may be link to an existing method, attack, and/or vulnerability of cyberattacks. For example, because of the constant evolution in cyberattacks, by the time indicia have been detected (and thus available for matching with ongoing electronic communications), the fraud has already been performed, and the detected indicia may already be outdated.

Accordingly, the systems and methods described herein disclose novel uses and/or improvements to sequence matching using artificial intelligence applications. Artificial intelligence, including, but not limited to, machine learning, deep learning, etc. (referred to collectively herein as artificial intelligence models, machine learning models, or simply models) refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in sequence matching. For example, without adequate training data, artificial intelligence models may lack the accuracy and/or precision needed.

To overcome this problem in adequate training data for an artificial intelligence-based solution to sequence matching in cyber fraud, the systems and methods recite a system that expands the available amount of data that may be used for training and/or detecting cyber fraud. In particular, as opposed to limiting training data (and/or successful matches) to patterns of text strings in electronic communications of user records, the systems and methods additionally generate training data (and/or successful matches) on the characteristics of the text strings themselves (e.g., the specific characters used, the length, the uniqueness of the text string, etc.). Moreover, the systems and methods may determine particular rules that an identified text string and/or characteristics thereof violates. The system may then use instances of the identified text string, characteristics thereof, and/or violated rule to supplement existing training data. Thus, the systems and methods mitigate the technical problem related to the limited training data.

Moreover, while receiving multiple outputs of multiple different times and/or from multiple different models would create contradictory determinations for cyber fraud (e.g., some outputs would indicate fraud while others do not), the systems and methods overcome this technical problem by using an additional normalization step. For example, the system normalizes output from the first model, the second model, and the third model by determining a first classification weight based on the first characteristic detected by the first model, a second classification weight based on the second characteristic detected by the second model, and a third classification weight based on third characteristic detected by the third model.

In some aspects, the systems and methods performing non-binary classification during sequence mining are described. For example, the system may receive a first user record, wherein the first user record comprises a first plurality of text strings. The system may parse the first plurality of text strings to identify a first text string in the first user record. The system may compare the first text string to the first plurality of text strings to determine a first characteristic for the first text string. The system may parse the first text string to determine a second characteristic for the first text string. The system may compare the first text string to a first rule to determine a third characteristic for the first text string. The system may determine a first classification weight based on the first characteristic, a second classification weight based on the second characteristic, and a third classification weight based on a third characteristic. The system may determine a first classification likelihood for the first text string based on the first classification weight, the second classification weight, and the third classification weight.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in performing non-binary classification during sequence mining, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
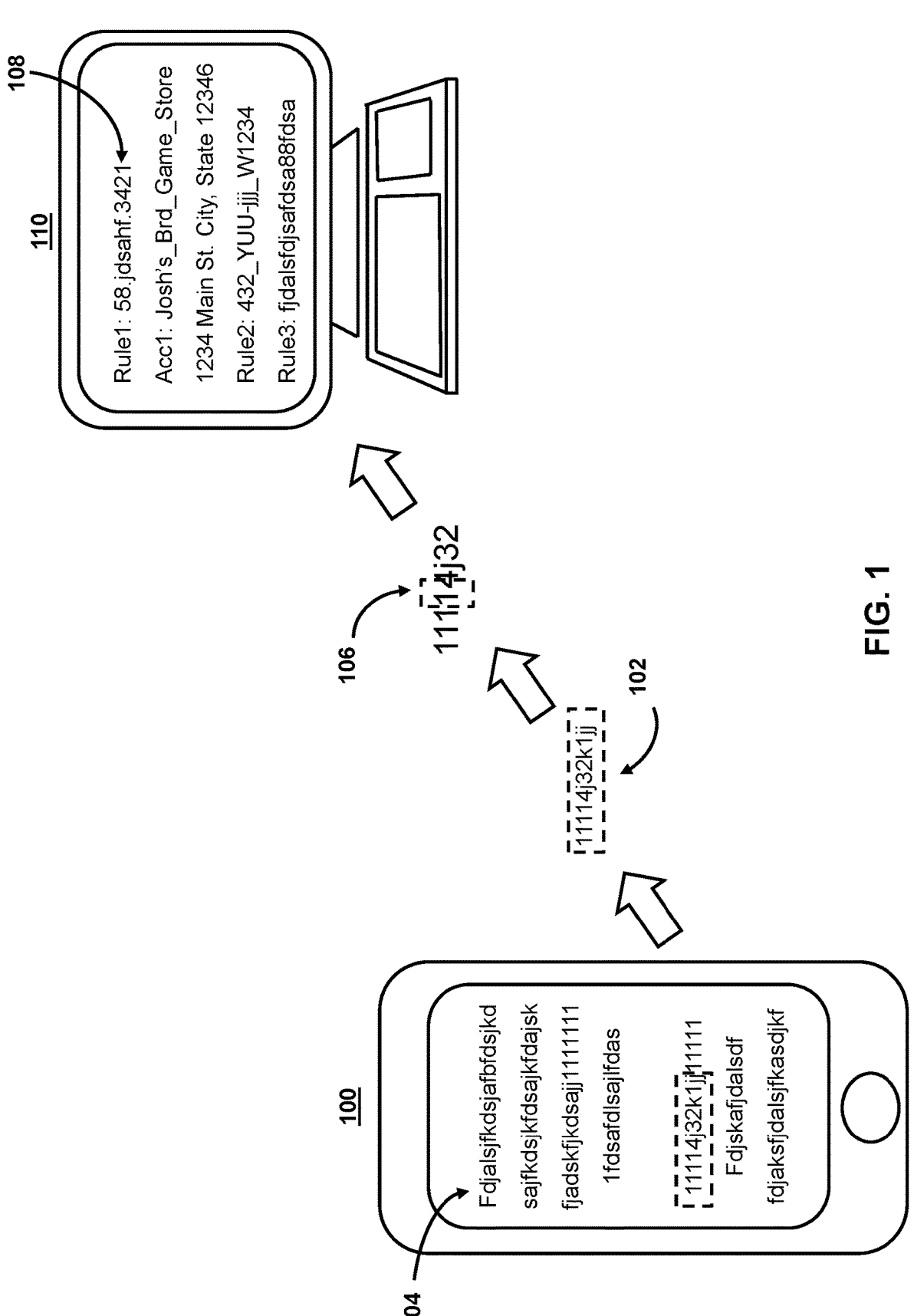
FIG. 1 shows an illustrative diagram for detecting cyber fraud in electronic content, in accordance with one or more embodiments.

FIG. 1 shows an illustrative diagram for detecting cyber fraud in electronic content, in accordance with one or more embodiments. The systems and methods recite a system that expands the available amount of data that may be used for training and/or detecting cyber fraud. In particular, as opposed to limiting training data (and/or successful matches) to patterns of text strings in content of user records, the system additionally generates training data (and/or successful matches) on the characteristics of the text strings themselves (e.g., the specific characters used, the length, the uniqueness of the text string, etc.). For example, a characteristic of a text string and/or character therein may comprise any attribute of a text string and/or character that distinguishes it from another text string and/or character.

For example, FIG. 1 includes user device 100, which is currently showing one or more text strings (e.g., text string 102) in a user interface. The text strings comprise a collection of characters appearing on the user interface. As referred to herein, a "user interface" may comprise a human-computer interaction and communication in a device, and may include display screens, keyboards, a mouse, and the appearance of a desktop. For example, a user interface may comprise a way a user interacts with an application or a website. The user interface on user device 100 may comprise text strings and/or other content. It should further be noted that any embodiments described herein related to text strings may also refer to other content.

As referred to herein, a text string may refer to a sequence of characters, which can include letters, numbers, symbols, and/or spaces. For example, a text string may comprise a fundamental data type used to represent and manipulate textual data within a computer program or system. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

For example, the system may receive a first user record (e.g., user record 104), wherein the first user record comprises a first plurality of text strings (e.g., text string 102). The user record may comprise any content. As described herein, a user record may refer to a set of data or information associated with an individual user within a system, platform, or database. It contains various details and attributes related to that user, providing a comprehensive profile or representation within the context of the application or service. For example, a user record may comprise unique identifiers such as username, user ID, email address, or phone number that distinguish one user from another within the system. In another example, a user record may comprise basic personal details like name, age, gender, date of birth, and address. In another example, a user record may comprise user authentication data, such as passwords, security questions, or biometric information, used to verify the user's identity and grant access to the system. In another example, a user record may comprise user-specific preferences, settings, or configurations for customizing their experience within the platform. This may include language preferences, display settings, notification preferences, etc. In another example, a user record may comprise records of the user's interactions with one or more systems, such as login history, transaction history, browsing history, actions performed, purchases made, or any other activities logged within the platform. For example, the system may determine a respective text string category for each text string in the first plurality of text strings and determine to parse the first text string based on the respective text string category for the first text string.

The system may detect one or more characteristics of the text string. For example, the system may parse the first plurality of text strings to identify a first text string (e.g., text string 102) in the first user record. The system may then compare the first text string to a first plurality of text strings (e.g., other text strings in one or more user records for one or more users) to determine a first characteristic for the first text string. Characteristics of text strings (e.g., characteristic 106) may include the sequence of characters in the text string. For example, the text string may be a sequential collection of characters, including letters, numbers, symbols, spaces, and special characters. Each character within a string holds a specific position or index, which may comprise a characteristic of the character within the text string. A characteristic of the text string may include its length. For example, text strings can vary in length, from an empty string (e.g., containing no characters) to very long strings encompassing numerous characters. In another example, characteristics of text strings may include concatenation. For example, strings can be concatenated, which means joining or combining two or more strings together to create a new string.

In some embodiments, various operations can be performed on strings, such as finding the length of a string, searching for specific substrings within a string, extracting substrings, converting case (upper/lower), replacing characters, etc. In some embodiments, the operations may include encodings and/or filtering. For example, text strings can be encoded using different character encoding schemes like ASCII, UTF-8, UTF-16, etc., to represent characters from various languages and character sets.

Moreover, the systems and methods may determine particular rules that an identified text string and/or characteristics thereof violates. For example, the system may compare text string 102 and/or characteristic 106 to rule 108 as displayed on user interface 110. The system may then use instances of the identified text string, characteristics thereof, and/or violated rule to supplement existing training data, detect a cyber attack, and/or recommendation. As described herein, a cyber attack ruleset may be a collection of predefined rules, patterns, or signatures used by cybersecurity systems to detect and potentially prevent various types of cyber threats or attacks. These rulesets may serve as guidelines or patterns that help security tools like intrusion detection systems (IDS), intrusion prevention systems (IPS), firewalls, and other security devices to identify suspicious or malicious activities within a network or system. The rulesets consist of specific criteria or conditions that, when met, indicate potential security threats or unauthorized access attempts. These criteria can include patterns in network traffic, behavior anomalies, known attack signatures, or characteristics associated with malware or cyber attacks.

The ruleset may relate to a required or approved signature. For example, the signature may comprise patterns or specific sequences of bytes, characters, or behaviors that match known attack patterns or malicious activities. Signatures can be based on known malware, exploits, command sequences, or abnormal behaviors. The ruleset may relate to a known protocol and/or detected anomaly. For example, the system may detect irregularities or anomalies in network protocols, such as unexpected or unauthorized network traffic, unusual port usage, malformed packets, or deviations from standard communication patterns. The ruleset may relate to a behavioral pattern. For example, the rulesets may utilize behavioral analysis to identify abnormal patterns of behavior, such as sudden spikes in data transfer, unusual login attempts, or atypical user behavior, which may indicate a compromise or breach.

In some embodiments, the system may use advanced rulesets that incorporate heuristic analysis or machine learning algorithms to detect unknown or evolving threats by learning from historical data and identifying patterns deviating from the norm. In some embodiments, the rulesets may define actions to be taken when a specific rule or pattern is matched. Actions might include logging the event, alerting security personnel, blocking suspicious traffic, or taking automated measures to prevent the detected threat.

In some embodiments, the system may perform an additional normalization step. For example, the system may normalize outputs from the first model, the second model, and the third model by determining a first classification weight based on the first characteristic detected by the first model, a second classification weight based on the second characteristic detected by the second model, and a third classification weight based on third characteristic detected by the third model. For example, normalizing outputs from different artificial intelligence models may involve the process of standardizing or scaling the outputs of these models to ensure consistency, comparability, or compatibility across different systems or models.

In some embodiments, the system may normalize the outputs using scaling or other normalization. For example, the system may use scaling and/or standardization, which involves scaling the outputs to a common range or standardizing them by subtracting the mean and dividing by the standard deviation. This method makes the outputs comparable by bringing them to a similar scale. In another example, the system may use min-max scaling, which involves transforming the outputs to a predefined range, typically between 0 and 1 or −1 and 1. This method preserves the relationships between the data points while scaling them to a common range. In another example, the system may use Z-Score normalization, which involves transforming the outputs to have a mean of 0 and a standard deviation of 1. It helps in standardizing outputs and making them comparable across different models. In another example, the system may use normalization by feature rescaling by adjusting the outputs of each model by taking into account the dynamic range of the data. This approach ensures that all features contribute equally to the comparison or combination process. In another example, the system may use ranking or percentile normalization, which involves converting the outputs to percentiles or rankings within a given dataset. This approach helps in comparing the relative performance of different models by assigning ranks or percentiles to their outputs.

In some embodiments, the system may assign weights to the outputs of different models by determining the relative importance or influence of each model's output in a combined or ensemble prediction. By doing so, the weighting scheme aims to leverage the strengths of individual models while compensating for their weaknesses, ultimately improving the overall predictive performance. As referred to herein, a weight for an output may refer to a numerical coefficient or factor assigned to the prediction or output of that specific model within an ensemble or combined system. These weights are used to determine the influence or contribution of each model's output when aggregating predictions or making decisions collectively. For example, when multiple models are combined or ensembled to generate a final prediction or decision, assigning weights to the outputs of these models helps in determining the significance or importance of each model's contribution. The weighted outputs are combined to create a final aggregated prediction or decision.

The system may use one or more techniques for determining the weight. For example, the system may use domain experts or data scientists that manually assign weights based on their knowledge and understanding of the models, their performance, and the context of the problem. This method requires expertise and domain knowledge but allows for fine-tuning based on qualitative assessments. In another example, the system may use performance metrics and assign weights based on the performance metrics of individual models. Models that exhibit better accuracy, precision, recall, or other relevant metrics may receive higher weights. For example, using validation or test data to evaluate each model's performance and allocating weights accordingly. In another example, the system may use ensemble learning techniques such as stacking, boosting, or bagging, where multiple models are combined to make predictions. Ensemble methods automatically assign different weights to individual models or model outputs based on their performance during the training phase or by considering their contribution to the overall ensemble performance. In another example, the system may use optimization algorithms or machine learning techniques to learn the optimal weights for combining model outputs. Techniques like gradient descent, genetic algorithms, or Bayesian optimization can be employed to find the weights that maximize predictive accuracy or minimize error. In another example, the system may use a meta-learning approach where another model learns the optimal combination or weights of individual models based on their historical performance or characteristics. In another example, the system may use expert judgment or predefined business rules might be used to assign weights based on qualitative assessments or specific business requirements.

Figure 2:
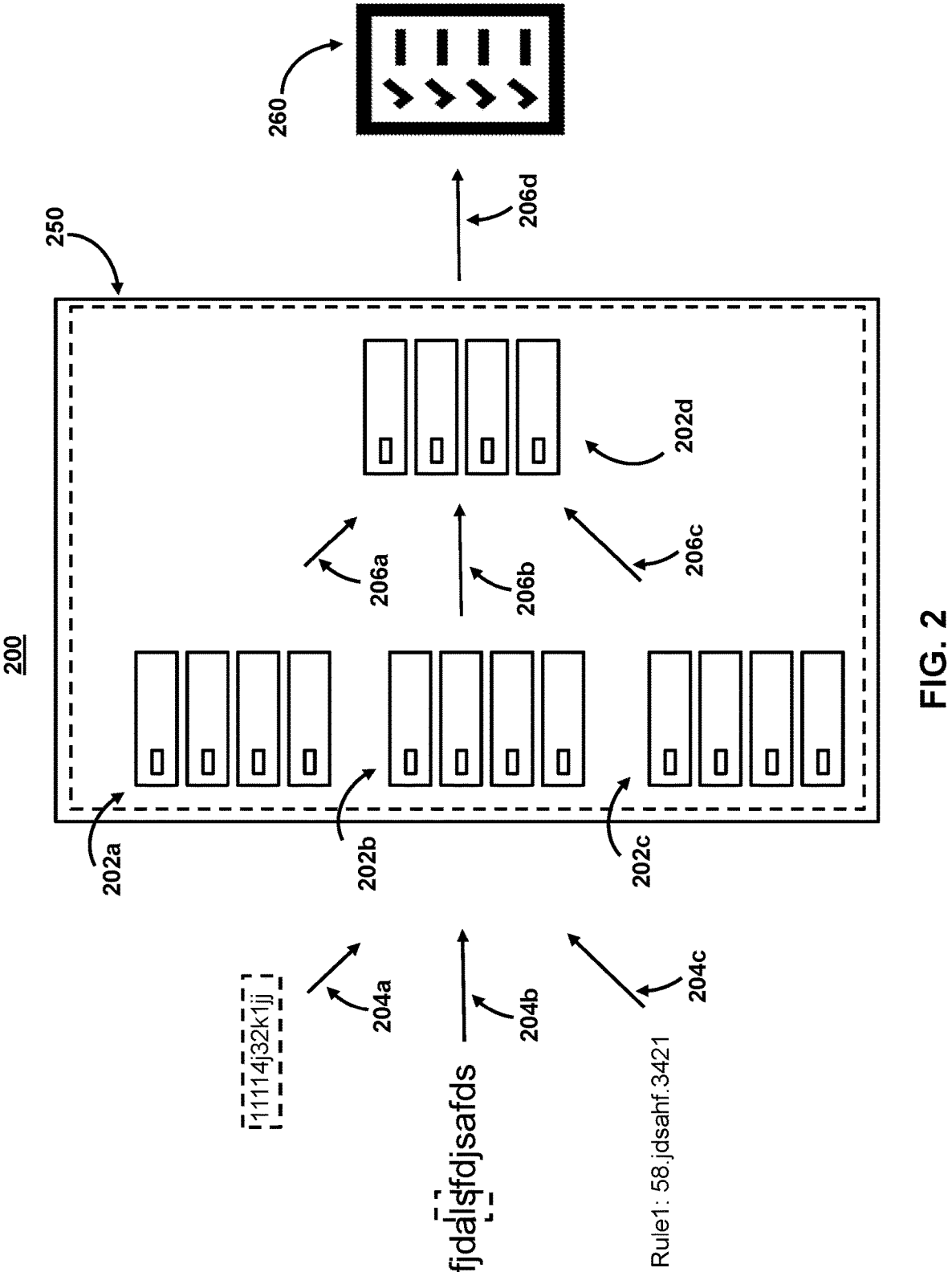
FIG. 2 shows an illustrative diagram for a system for determining classification likelihoods, in accordance with one or more embodiments.

FIG. 2 shows an illustrative diagram for a system for determining classification likelihoods, in accordance with one or more embodiments. System 200 includes one or more models. For example, system 200 may include model 202a, which is trained on first training data, wherein the first training data is generated based on labeled historical text strings in a plurality of historical user records. For example, model 202a may receive a text string as an input (e.g., text string 102 (FIG. 1)). For example, the system may gather a large dataset comprising historical user records containing text strings. These records may include various attributes and information associated with users. The system may preprocess the data by cleaning, normalizing, and transforming the text strings. This step involves tasks such as filtering the text strings and/or removing irrelevant characters, handling missing values, tokenizing text into words or phrases, and/or applying techniques like stemming or lemmatization to standardize the text. For example, the system may apply a first character filter to the first plurality of text strings to generate a filtered plurality of text strings and parse the filtered plurality of text strings.

The system may define the task or objective for the model. In this model, this involves generating labeled training data based on historical text strings and/or labeling involves assigning categories, classes, or target values to the text strings, indicating the information the model needs to learn (e.g., assign categories or classes based on the content). The system may convert the text strings into numerical or vector representations that can be understood by the model. The system may use techniques like word embeddings (e.g., Word2Vec, GloVe), TF-IDF (Term Frequency-Inverse Document Frequency), or more advanced methods like BERT or Transformer models to represent text data as numeric features. The system may train the model on the labeled historical text strings by feeding the generated features (vectors or representations) and corresponding labels into the model. The model learns patterns, relationships, and characteristics from the labeled data during this phase. Once the model performs satisfactorily, the system may use it to predict or classify text strings in new, unseen data (e.g., generate recommendations).

System 200 may include model 202b, which is trained on second training data, wherein the second training data is generated based on labeled historical characters in a plurality of historical text strings. For example, model 202b may receive a characteristic (e.g., of a text string and/or character) as an input (e.g., characteristic 106 (FIG. 1)). For example, the system may gather a dataset comprising historical text strings and segment these strings into individual characters or tokens. The system may label the characters within these text strings based on the specific task or objective. For instance, if the goal is language modeling, characters could be labeled to predict the next character in a sequence (and/or other classifications such as a cyber attack likelihood). The system may convert the characters into numeric representations or embeddings that the model can process. Common approaches include one-hot encoding (assigning a unique number to each character), using embeddings (vector representations) for characters, or employing more advanced encoding techniques such as byte-pair encoding (BPE) or subword tokenization. The system may utilize sequence modeling architectures, such as recurrent neural networks (RNNs), long short-term memory networks (LSTMs), or gated recurrent units (GRUs), that can understand sequential data and learn from the historical character sequences (and/or other classifications such as a cyber attack likelihood). The system may then train the model to predict the next character in a sequence given the previous characters. This approach is commonly used in language modeling or text generation tasks. The system may feed the labeled historical characters and their sequences into the model. The model learns the patterns, relationships, and dependencies among characters within text strings during the training process. The system may adjust the model's parameters iteratively to optimize its ability to generate accurate predictions or classifications. The system may evaluate the model's performance using appropriate metrics for sequence prediction tasks, such as perplexity or accuracy in predicting the next character.

System 200 may include model 202c, which is trained on third training data, wherein the second training data is generated based on labeled rule violations in a plurality of detected cyberattacks. For example, model 202c may receive a rule as an input (e.g., rule 108 (FIG. 1)). For example, the system may gather a dataset comprising labeled data from detected cyberattacks. This dataset should contain instances of rule violations or anomalies that are labeled as cyberattack instances. The system may preprocess the data by cleaning, transforming, and encoding it into a format suitable for training the model. This could involve feature extraction, normalization, and encoding of relevant attributes or features related to the detected cyberattacks. The system may identify and label instances within the dataset that represent rule violations or anomalies associated with cyberattacks. These labeled instances serve as the training data for the AI model to learn patterns and characteristics indicative of cyberattacks. The system may extract relevant features or attributes from the labeled data that describe the characteristics of rule violations or anomalies detected during cyberattacks. These features could include network traffic patterns, abnormal system behaviors, timestamps, source IP addresses, destination addresses, etc. The system may engineer or preprocess these features to create informative representations that can be fed into the model for training.

The system may receive outputs (e.g., output 206*a*, output 206*b*, and output 206*c*) from model 202*a-c*. The system may normalize outputs from the first artificial intelligence model, the second artificial intelligence model, and the third artificial intelligence model by determining a first classification weight based on the first characteristic, a second classification weight based on the second characteristic, and a third classification weight based on a third characteristic. To do so, the system may obtain the outputs or predictions generated by the first, second, and third artificial intelligence models for a given set of data or samples. The system may normalize these outputs individually to ensure they are on a common scale or range, using techniques such as min-max scaling, z-score normalization, or other normalization methods suitable for the specific characteristics of the model outputs. The system may identify the characteristics or features based on which the classification weights need to be determined. These characteristics could be specific aspects or attributes related to the predictions made by each model. For each characteristic, the system may devise a process to determine the classification weight. This could involve domain knowledge, statistical analysis, or machine learning techniques. For example, if the first characteristic represents confidence scores, you might determine the first classification weight by analyzing the confidence distributions from the first model's outputs. This could involve statistical measures like mean, median, or variance to assign the weight. Similarly, for the second and third characteristics, devise methods to determine their respective classification weights based on their significance or relevance to the classification task.

System 200 may include model 202*d*, which is trained on fourth training data, wherein the fourth training data is generated based on labeled indicia (e.g., labeled text strings, characters in the text strings, characteristics of the characters and text strings, and/or the rules violated by the text strings) of detected cyberattacks. For example, the system may collect a dataset containing indicia of detected cyberattacks. This dataset should encompass text strings, characters within those strings, features or characteristics extracted from the text, and indications of rule violations or anomalies associated with cyberattacks. The system may annotate this data by labeling instances according to the identified indicia, indicating which instances represent cyberattacks or rule violations. The system may extract features from the text strings and characters that could provide valuable information for detecting cyberattacks. This could include linguistic features, statistical measures, syntactic or semantic representations, n-grams, character embeddings, etc. The system may engineer or preprocess these features to create meaningful representations that capture relevant information about the text strings, characters, and their characteristics. The system may deploy the trained model into production for real-time detection or classification of cyberattacks based on the labeled indicia in incoming data streams.

The system may then generate output 206*d* based on a first classification likelihood for the first text string based on the first classification weight, the second classification weight, and the third classification weight. Once the classification weights for each characteristic are determined, combine the normalized outputs from the models using these weights. The system may use weighted combination methods like weighted averaging, weighted sum, or weighted voting can be used to fuse the normalized outputs. In such cases, each model's output is multiplied by its respective classification weight and then combined to generate a final aggregated output. After combining the outputs using the classification weights, the system might consider performing an additional normalization step on the combined output to ensure the final result remains on a consistent scale or range.

The system may generate for display, on a user interface, a recommendation (e.g., recommendation 260) based on the first classification likelihood. For example, the system may generate a recommendation based on the first classification likelihood using the probability or confidence scores provided by a classification model to suggest a particular course of action or decision. For example, the system may determine a threshold value if needed. The threshold can help decide when to consider the classification likelihood as sufficiently high to make a recommendation. For example, a threshold might be set at 0.7 probability, and only predictions above this value are considered for making recommendations. Based on the classification likelihood obtained from the first model the system may determine if the likelihood exceeds the predefined threshold (if applicable) or is considered high enough based on the system's criteria. The system may generate a recommendation associated with the predicted class or outcome. The recommendation could be a suggested action, decision, next step, product recommendation, or any other output relevant to the application's context. If the likelihood does not meet the threshold or is considered too low, the system may take a default action, seek additional information, flag for human review, or refrain from making a recommendation.

Model 202*a-d*, which may be a machine learning model, artificial intelligence model, etc. (which may be referred collectively as "models" herein). Model 202*a-d* may take inputs 204*a-d* and provide outputs 206*a-d*. The inputs may include multiple datasets, such as a training dataset and a test dataset. Each of the plurality of datasets (e.g., inputs 204*a-d*) may include data subsets related to user data, predicted forecasts and/or errors, and/or actual forecasts and/or errors. In some embodiments, outputs 206*a-d* may be fed back to model 202*a-d* as input to train model 202*a-d* (e.g., alone or in conjunction with user indications of the accuracy of outputs 206*a-d*, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a characteristic, weight, classification likelihood, recommendation, etc.).

In a variety of embodiments, model 202*a-d* may update its configurations (e.g., weights, biases, or other parameters) based on the assessment of its prediction (e.g., outputs 206*a-d*) and reference feedback information (e.g., user indication of accuracy, reference labels, or other information). In a variety of embodiments, where model 202*a-d* is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 202a-d may be trained to generate better predictions.

In some embodiments, model 202a-d may include an artificial neural network. In such embodiments, model 202a-d may include an input layer and one or more hidden layers. Each neural unit of model 202a-d may be connected with many other neural units of model 202a-d. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 202a-d may be self-learning and trained, rather than explicitly programmed, and can perform significantly better in certain areas of problem solving, as compared to traditional computer programs. During training, an output layer of model 202a-d may correspond to a classification of model 202a-d, and an input known to correspond to that classification may be input into an input layer of model 202a-d during training. During testing, an input without a known classification may be input into the input layer, and a determined classification may be output.

In some embodiments, model 202a-d may include multiple layers (e.g., where a signal path traverses from front layers to back layers). In some embodiments, back propagation techniques may be utilized by model 202a-d where forward stimulation is used to reset weights on the "front" neural units. In some embodiments, stimulation and inhibition for model 202a-d may be more free-flowing, with connections interacting in a more chaotic and complex fashion. During testing, an output layer of model 202a-d may indicate whether or not a given input corresponds to a classification of model 202a-d (e.g., a characteristic, weight, classification likelihood, recommendation, etc.).

In some embodiments, the model (e.g., model 202a-d) may automatically perform actions based on outputs 206a-d. In some embodiments, the model (e.g., model 202a-d) may not perform any actions. The output of the model (e.g., model 202a-d) may be used to detect cyber attacks.

System 200 also includes API layer 250. API layer 250 may allow the system to generate summaries across different devices. Alternatively or additionally, API layer 250 may reside on one or more of components. API layer 250 (which may be A REST or Web services API layer) may provide a decoupled interface to data and/or functionality of one or more applications. API layer 250 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 250 may use various architectural arrangements. For example, system 300 may be partially based on API layer 250, such that there is strong adoption of SOAP and RESTful Web-services, using resources like Service Repository and Developer Portal, but with low governance, standardization, and separation of concerns. Alternatively, system 300 may be fully based on API layer 250, such that separation of concerns between layers like API layer 250, services, and applications are in place.

In some embodiments, the system architecture may use a microservice approach. Such systems may use two types of layers: Front-End Layer and Back-End Layer where microservices reside. In this kind of architecture, the role of the API layer 250 may provide integration between Front-End and Back-End. In such cases, API layer 250 may use RESTful APIs (exposition to front-end or even communication between microservices). API layer 250 may use AMQP (e.g., Kafka, RabbitMQ, etc.). API layer 250 may use incipient usage of new communications protocols such as gRPC, Thrift, etc.

In some embodiments, the system architecture may use an open API approach. In such cases, API layer 250 may use commercial or open source API Platforms and their modules. API layer 250 may use a developer portal. API layer 250 may use strong security constraints applying WAF and DDoS protection, and API layer 250 may use RESTful APIs as standard for external integration.

Figure 3:
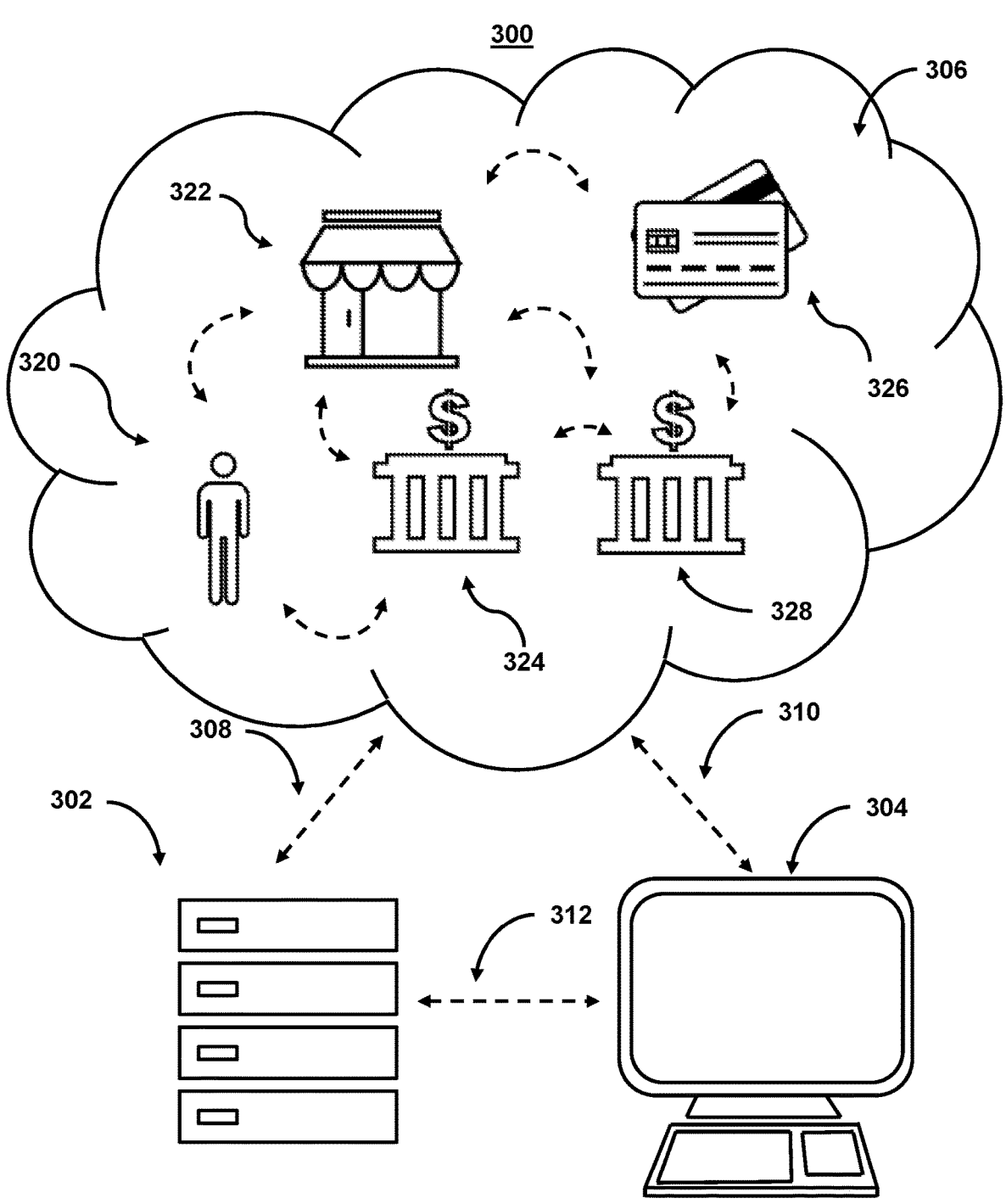
FIG. 3 shows illustrative components for a system used to detect cyber fraud, in accordance with one or more embodiments.

FIG. 3 shows illustrative system components related to parallel processing of batch communications, in accordance with one or more embodiments. As shown in FIG. 3, system 300 may include local server 302, user terminal 304, and cloud server 306. It should be noted that each component of system 300 may include additional subcomponents (e.g., additional servers and/or networks). System 300 may be used to process communications that may include user record data (e.g., data related to a transaction), resolve conflicts/corruptions, generate user queries, and/or compare source (e.g., merchant) data. It should be noted that server 302, user terminal 304, and server 306 may be any computing device, including, but not limited to, a laptop computer, a tablet computer, a hand-held computer, other computer equipment (e.g., a server), including "smart," wireless, wearable, and/or mobile devices. FIG. 3 also includes server 306. Server 306 may alternatively be any computing device as described above and may include any type of mobile terminal, fixed terminal, or other device. For example, server 306 may be implemented as a cloud computing system and may feature one or more component devices. It should also be noted that system 300 is not limited to three devices. Users may, for instance, utilize one or more other devices to interact with one another, one or more servers, or other components of system 300. It should be noted that, while one or more operations are described herein as being performed by particular components of system 300, those operations may, in some embodiments, be performed by other components of system 300. In some embodiments, the various computers and systems described herein may include one or more computing devices that are programmed to perform the described functions. Additionally, or alternatively, multiple users may interact with system 300 and/or one or more components of system 300. For example, in one embodiment, a first user (e.g., a credit card holder, aggregation service, credit provider, etc.) and a second user (e.g., a merchant/source, a credit card issuer, etc.) may interact with system 300 using two different components.

With respect to the components of server 302, user terminal 304, and server 306, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to aggregating record data, resolving conflicts (e.g., either transmitting requests between components, receiving requests between components, and/or processing requests between components). For example, the processors may be programmed to provide information processing capabilities in the computing devices. As such, the processors may include one or more digital processors, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the Internet, a mobile phone network, a mobile voice, or data network (e.g., a 5G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Server 306 may be a database configured to store user data, process communications, record data, and/or process requests for aggregating of user record data, resolving conflicts, generating user queries, and/or comparing source data. For example, the database may include user record data that the system has collected about the user through prior transactions. Alternatively, or additionally, the system may act as a clearing house for multiple sources of information about the user. Server 306 may also include control circuitry configured to perform the various operations needed to verify the identity of a user through contextual knowledge-based authentication.

In some embodiments, a request to process communications, authenticate transactions, aggregate user record data, resolve conflicts, generate user queries, compare source data, and/or generate similarity metrics may be structured as an API request that includes a URL, body, and method. The API request may correspond to one half of the API request-response cycle between one or more devices and/or applications to complete the request. For example, the system may communicate in HTTP (Hyper Text Transfer Protocol) through a request-response cycle.

These requests may also direct a batch of communication to a batch processing unit. To make a valid request, the requester (e.g., server 302) may include a URL (Uniform Resource Locator), method, list of headers, and/or body. The URL may indicate to server 306 (or other component) what resources to use. The body may contain headers and data. The headers may provide metadata about the request (e.g., the name of the requester, the user account for which access is needed, etc.) and the body may indicate the name of the user for which a request relates.

System 300 may be used for aggregating user record data, resolving conflicts, generating user queries, comparing source data, and/or generating similarity metrics. One component may be an application running on a mobile device of a user. As referred to herein, user record data and/or user account data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). However, this information may be transmitted in a continuous text string. Continuous data may be data which can take any values.

Another component of the system shown in FIG. 3 is user terminal 304. User terminal 304 may allow a user to access and/or submit information for parallel processing of batch communications. User terminal 304 may also generate for display user queries. The various components of system 300 may work in conjunction to create a credit card transaction eco-system.

For example, system 300 may involve multiple components and involve requests from one or more entities such as cardholder 320. A cardholder 320 may include a user that accesses an aggregation service in order to aggregate transactions of that user. For example, a given user may have multiple credit card accounts and thus correspond to a cardholder for multiple credit card networks. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 300 may also include source 322, which may be associated with a store and/or vendor that sells goods and/or services to the cardholder. As referred to herein, a source may include a data source and/or correspond to a data source of one or more communications. Source 322, which may be a merchant, may accept credit card payments. Source 322 may also send card and/or user account information to, and request payment authorization from, an issuing bank of cardholder 320. Source 322 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

For example, as part of a request, a communication from a source (or data source) may include various information about a communication:

Merchant ID: 12345

Network Name: Josh's Board Game Store

Address: 1234 Main St. City, State 12346

However, due to the conversion of the information in the communication as it traverses the various components shown in FIG. 3, the information may be transmitted in a continuous data string that may or may not be human-readable. Source 322 may include an acquiring bank 324, which may also comprise an acquiring processor or service provider. For example, the acquiring bank may receive payment authorization requests from source 322 and send them to issuing bank 328 (which may include, or be a separate entity from, acquiring bank 324). The acquiring bank 324 may then relay a response from issuing bank 328 to source 322. In some embodiments, acquiring bank 324 may be a third-party entity. Acquiring bank 324 may provide a service or device that allows source 322 to accept credit cards as well as send credit card payment details to network 326. Upon receipt, network 326 may forward the payment authorization back to acquiring bank 324.

Network 326 may include entities that operate credit card networks that process credit card payments worldwide and govern interchange fees. In some embodiments, issuing bank 328 may form part of network 326. For example, issuing bank 328 may be a financial institution that issued the credit card involved in the transaction. Issuing bank 328 may receive the payment authorization request from the credit card network and either approve or decline the transaction.

During processing, the components of system 300 may use multiple naming conventions, format, and value types of a category, value, etc. and these may differ from that of the user profile data (as stored on a user device or financial service provider), server 306 (or other component of system 300) may use matching algorithms that may support exact match techniques and/or partial or "fuzzy" matching logic (e.g., searching for a closest or partial match) to locate alternate spellings, naming conventions, etc. for categories and/or value. For example, a column name associated with user data stored by an aggregation service may be compared to a category and/or value for the issuing bank 328. In another example, metadata associated with user data stored by a financial service provider (e.g., describing a transaction in the account of the user) may be compared to metadata of a corresponding record, entry, category, and/or value for the issuing bank 328.

In some embodiments, system 300 may compare data between system components during a transaction and/or communication. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 322 must obtain approval for payment from issuing bank 328. Source 322 may transmit record data that may include: a credit card number, card expiration date, billing address (e.g., for address verification system ("AVS")), a validation card security code ("CVV"), and/or a payment amount.

As the transaction moves through system 300, issuing bank 328 may receive the payment authorization request from network 326. Issuing bank 328 validates the credit card number, checks the amount of available funds, matches the billing address to the one on file and validates the CVV number. Issuing bank 328 approves, or declines, the transaction and sends back an appropriate response to source 322 through system 300 (e.g., via network 326 and/or acquiring bank 324). Source 322 may receive the authorization, and issuing bank 328 may place a hold in the amount of the purchase on the account of cardholder 320. A point-of-sale terminal (e.g., user terminal 304) may send all approved authorizations to be processed in a "batch" (e.g., at the end of a day, accounting period, etc.). Notably, transmitting authorizations in batches increases the need for accurate and precise data and/or conflict resolutions at a high rate of speed.

During the clearing stage, the transaction is posted to both a credit card account of cardholder 320 and source 322. Source 322 then sends the approved authorizations in a batch to acquiring bank 324. Acquiring bank 324 then routes the batched information to network 326 for settlement. Network 326 forwards each approved transaction to an appropriate issuing bank 328. Issuing bank 328 will transfer the funds and may withhold exchange fees. Network 326 may also pay acquiring bank 324 a fee. Issuing bank may then post the user record data to an account of cardholder 320.

Thus, a single transaction includes multiple systems each interacting with each other and handling user data that must be stored, transmitted, and verified in a precise manner. In order to ensure precision, each system and/or component of a system may use its own (and in many cases proprietary) encoding mechanisms. Additionally, or alternatively, source 322, acquiring bank 324, network 326, and/or issuing bank 328 each transmit a network name (e.g., an identification system used by an assigning party to indicate a source (e.g., source 322) corresponding to a transaction). However, as each system may use a private (and likely proprietary) algorithm for facilitating transactions, a network name generated and used by one component (e.g., network 326) may not be the same as the network name used by another network.

In some embodiments, other information may vary as well. For example, information about a source (e.g., address) may not be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user (e.g., cardholder 320) based on exchange fee information.

Network name data is also not meant to be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable.

FIG. 4 shows a flowchart of the steps involved in performing non-binary classification during sequence mining, in accordance with one or more embodiments. For example, the system may use process 400 (e.g., as implemented on one or more system components described above) in order to prevent and/or mitigate cyberattacks and/or cyber fraud.

At step 402, process 400 (e.g., using one or more components described above) may receive a user record. For example, the system may receive a first user record, wherein the first user record comprises a first plurality of text strings.

At step 404, process 400 (e.g., using one or more components described above) may identify a text string in the user record. For example, the system may parse the first plurality of text strings to identify a first text string in the first user record. In some embodiments, the system may parse, using a first artificial intelligence model, the first plurality of text strings to identify a first text string in the first user record, wherein the first artificial intelligence model is trained on first training data, wherein the first training data is generated based on labeled historical text strings in a plurality of historical user records.

At step 406, process 400 (e.g., using one or more components described above) may compare the text string to the plurality of text strings to determine a first characteristic. For example, the system may compare the first text string to the first plurality of text strings to determine a first characteristic for the first text string.

In some embodiments, the system may compare the first text string to the first plurality of text strings to determine the first characteristic for the first text string by determining a number of matches between the first text string and other text strings in the first plurality of text strings and determining the first characteristic based on the number of matches. For example, the system may choose a set of text strings from the dataset or repository against which the first text string will be compared. This set constitutes the first plurality of text strings. The system may compare the first text string with each text string in the first plurality of text strings. The comparison process can involve various methods, such as: exact string matching (e.g., checking for identical matches between the first text string and each text string in the plurality), fuzzy string matching (e.g., assessing similarity using algorithms like Levenshtein distance, Jaccard similarity, or cosine similarity to determine matches considering slight variations or similarities between strings), pattern matching or regular expressions (e.g., identifying patterns or specific sequences that match between the text strings). The system may then counting the number of matches. For example, the system may count the total number of matches or occurrences where the first text string matches with other text strings within the first plurality of text strings. Each match contributes to incrementing the count. The system may determine the first characteristic for the first text string based on the number of matches obtained in the previous step. For instance, if the number of matches exceeds a certain threshold or is within a specified range, set the first characteristic to indicate the degree or frequency of similarity between the first text string and the other text strings. This could be a categorical label (e.g., high similarity, moderate similarity, low similarity) or a numeric value indicating the match count. The system may then associate the determined first characteristic with the first text string based on the match count and the predefined criteria established from the comparison process. The system may use the determined first characteristic for the first text string in subsequent analysis, classification, decision-making, or any other application where the characteristic information is relevant.

In some embodiments, the system may compare the first text string to the first plurality of text strings to determine the first characteristic for the first text string by determining a first text string sequence in the first plurality of text strings, wherein the first text string sequence comprises the first text string and a second text string, and determining the first characteristic based on the first text string sequence. For example, the system may determine a sequence of not only characters in a text string, but also text strings in a user record. For example, a given sequence of text strings may be labeled with a likely cyber attack, weight, classification, etc.

At step 408, process 400 (e.g., using one or more components described above) may parse the text string to determine a second characteristic. For example, the system may parse the first text string to determine a second characteristic for the first text string. In some embodiments, the system may parse using a second artificial intelligence model, the first text string to determine a second characteristic for the first text string, wherein the second artificial intelligence model is trained on second training data, wherein the second training data is generated based on labeled historical characters in a plurality of historical text strings.

In some embodiments, the system may parse the first text string to determine the second characteristic for the first text string by determining a character length of the first text string and determining the second characteristic based on the character length. Based on the length of the text string, the system may establish rules or conditions to assign or determine the second characteristic. For example, a longer pattern may be more unique (e.g., less often repeated) and thus a greater indicator of a specific indicia. Additionally or alternatively, parsing the first text string to determine the second characteristic for the first text string may comprise the system determining a number of different characters in the first text string and determining the second characteristic based on the number of different characters. For example, the more unique the characters or the number of different characters that make up a text string may be a greater indicator of a specific indica.

At step 410, process 400 (e.g., using one or more components described above) may compare the text string to a rule to determine a third characteristic. For example, the system may compare the first text string to a first rule to determine a third characteristic for the first text string. In some embodiments, the system may compare, using a third artificial intelligence model, the first text string to a first rule to determine a third characteristic for the first text string, wherein the third artificial intelligence model is trained on third training data, wherein the third training data is generated based on labeled rule violations in a plurality of detected cyberattacks.

At step 412, process 400 (e.g., using one or more components described above) may determine classification weights based on the characteristics. For example, the system may determine a first classification weight based on the first characteristic, a second classification weight based on the second characteristic, and a third classification weight based on the third characteristic. In some embodiments, determining the first classification weight based on the first characteristic may comprise determining a frequency that a text string comprises the first characteristic and determining the first classification weight based on the frequency. For example, the lower the frequency (e.g., the more unique) the text string or the higher the frequency (e.g., the more often a text string is present) may weigh on the likelihood of an indication of a cyber attack.

At step 414, process 400 (e.g., using one or more components described above) may determine a classification likelihood based on the weights. For example, the system may determine a first classification likelihood for the first text string based on the first classification weight, the second classification weight, and the third classification weight. In some embodiments, the system may determine, using a fourth artificial intelligence model, a first classification likelihood for the first text string based on the first classification weight, the second classification weight, and the third classification weight, wherein the fourth artificial intelligence model is trained on fourth training data, wherein the fourth training data is generated based on labeled indicia of detected cyberattacks.

In some embodiments, the system may determine the first classification likelihood for the first text string is further based on comparing the first text string to a first rule to determine a third characteristic for the first text string. The system may then determine a value for the first rule and determine the first classification weight based on the third characteristic and the value. For example, the system may compare the first text string with the first rule. This comparison could involve pattern matching, rule-based analysis, similarity measures, or any method specified by the rule to assess the text string. Based on the comparison outcome, the system may determine a third characteristic for the first text string. This characteristic could represent a specific attribute or quality inferred from the comparison with the rule. For instance, if the rule pertains to sentiment analysis, the third characteristic might indicate the sentiment polarity (positive, negative, neutral) of the text string. The system may then assess the value associated with the first rule based on the comparison result and the context of the rule itself. This value could be binary (e.g., 0 or 1), categorical, or continuous, depending on the rule and its evaluation criteria. The system may then use the determined third characteristic and the value obtained for the first rule to calculate the first classification weight. This calculation could involve a predefined formula, function, or decision-making process specifically designed to derive the weight based on the characteristic and rule value. For example, if the third characteristic represents the relevance of the text string to the rule, and the rule value is high (indicating a strong match), the first classification weight might be assigned a higher value to emphasize the importance of the rule in the classification process. The system may then utilize the determined first classification weight in the classification process. It might be used in combination with other weights or characteristics to calculate the likelihood or confidence of the text string belonging to a particular class or category.

In some embodiments, the system may retrieve a threshold classification likelihood for a first recommendation. The system may compare the first classification likelihood to the threshold classification likelihood. The system may generate for display, on a user interface, the first recommendation based on comparing the first classification likelihood to the threshold classification likelihood. In some embodiments, the system may retrieve the threshold classification likelihood for the first recommendation by determining a type of the first recommendation and selecting the threshold classification likelihood based on the type.

In some embodiments, the system may perform multiple iterations. For example, the system may receive a second user record, wherein the second user record comprises a second plurality of text strings and compare the first text string to a second plurality of text strings to determine a third characteristic for the first text string. For example, the system may receive an aggregation of a plurality of user records, wherein the aggregation of the plurality of user records comprises a third plurality of text strings. The system may compare the first text string to the third plurality of text strings to determine a fourth characteristic for the first text string.

In some embodiments, the system may receive a second user record, wherein the second user record comprises a second text string. The system may determine the first classification likelihood for the second text string. The system may generate for display, on a user interface, a recommendation based on determining the first classification likelihood for the first text string and the second text string.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for performing non-binary classification during sequence mining,
2. The method of the preceding embodiment comprising: receiving a first user record, wherein the first user record comprises a first plurality of text strings; parsing the first plurality of text strings to identify a first text string in the first user record; comparing the first text string to the first plurality of text strings to determine a first characteristic for the first text string; parsing the first text string to determine a second characteristic for the first text string; comparing the first text string to a first rule to determine a third characteristic for the first text string; determining a first classification weight based on the first characteristic, a second classification weight based on the second characteristic, and a third classification weight based on third characteristic; and determining a first classification likelihood for the first text string based on the first classification weight, the second classification weight, and the third classification weight.

3. The method of any one of the preceding embodiments, wherein determining the first classification likelihood for the first text string is further based on: comparing the first text string to a first rule to determine a third characteristic for the first text string; determining a value for the first rule; and determining the first classification weight based on the third characteristic and the value.

4. The method of any one of the preceding embodiments, wherein comparing the first text string to the first plurality of text strings to determine the first characteristic for the first text string further comprises: determining a number of matches between the first text string and other text strings in the first plurality of text strings; and determining the first characteristic based on the number of matches.

5. The method of any one of the preceding embodiments, wherein comparing the first text string to the first plurality of text strings to determine the first characteristic for the first text string further comprises: determining a first text string sequence in the first plurality of text strings, wherein the first text string sequence comprises the first text string and a second text string; and determining the first characteristic based on the first text string sequence.

6. The method of any one of the preceding embodiments, wherein parsing the first text string to determine the second characteristic for the first text string further comprises: determining a character length of the first text string; and determining the second characteristic based on the character length.

7. The method of any one of the preceding embodiments, wherein parsing the first text string to determine the second characteristic for the first text string further comprises: determining a number of different characters in the first text string; and determining the second characteristic based on the number of different characters.

8. The method of any one of the preceding embodiments, wherein determining the first classification weight based on the first characteristic further comprises: determining a frequency that a text string comprises the first characteristic; and determining the first classification weight based on the frequency.

9. The method of any one of the preceding embodiments, further comprising: retrieving a threshold classification likelihood for a first recommendation; comparing the first classification likelihood to the threshold classification likelihood; and generating for display, on a user interface, the first recommendation based on comparing the first classification likelihood to the threshold classification likelihood.

10. The method of any one of the preceding embodiments, wherein retrieving the threshold classification likelihood for the first recommendation further comprising: determining a type of the first recommendation; and selecting the threshold classification likelihood based on the type.

11. The method of any one of the preceding embodiments, further comprising: receiving a second user record, wherein the second user record comprises a second plurality of text strings; and comparing the first text string to a second plurality of text strings to determine a third characteristic for the first text string;

12. The method of any one of the preceding embodiments, further comprising: receiving an aggregation of a plurality of user records, wherein the aggregation of the plurality of user records comprises a third plurality of text strings; and comparing the first text string to the third plurality of text strings to determine a fourth characteristic for the first text string.

13. The method of any one of the preceding embodiments, wherein parsing the first plurality of text strings to identify the first text string in the first user record further comprises: applying a first character filter to the first plurality of text strings to generate a filtered plurality of text strings; and parsing the filtered plurality of text strings.

14. The method of any one of the preceding embodiments, wherein parsing the first plurality of text strings to identify the first text string in the first user record further comprises: determining a respective text string category for each text string in the first plurality of text strings; and determining to parse the first text string based on the respective text string category for the first text string.

15. The method of any one of the preceding embodiments, further comprising: receiving a second user record, wherein the second user record comprises a second text string; determining the first classification likelihood for the second text string; and generating for display, on a user interface, a recommendation based on determining the first classification likelihood for the first text string and the second text string.

16. The method of any one of the preceding embodiments, wherein the first artificial intelligence model is trained on first training data, wherein the first training data is generated based on labeled historical text strings in a plurality of historical user records.

17. The method of any one of the preceding embodiments, wherein the second artificial intelligence model is trained on second training data, wherein the second training data is generated based on labeled historical characters in a plurality of historical text strings.

18. The method of any one of the preceding embodiments, wherein the third artificial intelligence model is trained on third training data, wherein the third training data is generated based on labeled rule violations in a plurality of detected cyberattacks.

19. The method of any one of the preceding embodiments, wherein the fourth artificial intelligence model is trained on fourth training data, wherein the fourth training data is generated based on labeled indicia of detected cyberattacks.

20. One or more non-transitory, computer-readable mediums storing instructions that, when executed by a data processing apparatus, cause the data processing apparatus to perform operations comprising those of any of embodiments 1-19.

21. A system comprising one or more processors; and memory storing instructions that, when executed by the processors, cause the processors to effectuate operations comprising those of any of embodiments 1-19.

22. A system comprising means for performing any of embodiments 1-19.

What is claimed is:

1. A system for performing non-binary classification during sequence mining, the system comprising:

one or more processors; and one or more non-transitory, computer-readable mediums comprising instructions recorded thereon that when executed by the one or more processors cause operations comprising:

receiving a first user record, wherein the first user record comprises a first plurality of text strings;

parsing, using a first artificial intelligence model, the first plurality of text strings to identify a first text string in the first user record, wherein the first artificial intelligence model is trained on first training data, wherein the first training data is generated based on labeled historical text strings in a plurality of historical user records;

comparing the first text string to the first plurality of text strings to determine a first characteristic for the first text string;

parsing, using a second artificial intelligence model, the first text string to determine a second characteristic for the first text string, wherein the second artificial intelligence model is trained on second training data, wherein the second training data is generated based on labeled historical characters in a plurality of historical text strings;

comparing, using a third artificial intelligence model, the first text string to a first rule to determine a third characteristic for the first text string, wherein the third artificial intelligence model is trained on third training data, wherein the third training data is generated based on labeled rule violations in a plurality of detected cyberattacks;

normalizing outputs from the first artificial intelligence model, the second artificial intelligence model, and the third artificial intelligence model by transforming the outputs using a first classification weight based on the first characteristic, a second classification weight based on the second characteristic, and a third classification weight based on third characteristic;

determining, using a fourth artificial intelligence model, a first classification likelihood for the first text string based on the first classification weight, the second classification weight, and the third classification weight, wherein the fourth artificial intelligence model is trained on fourth training data, wherein the fourth training data is generated based on labeled indicia of detected cyberattacks; and generating for display, on a user interface, a recommendation based on the first classification likelihood.

2. A method for performing non-binary classification during sequence mining, the method comprising:

receiving a first user record, wherein the first user record comprises a first plurality of text strings;

parsing the first plurality of text strings to identify a first text string in the first user record;

comparing the first text string to the first plurality of text strings to determine a first characteristic for the first text string;

parsing the first text string to determine a second characteristic for the first text string;

comparing the first text string to a first rule to determine a third characteristic for the first text string;

determining a first classification weight based on the first characteristic, a second classification weight based on the second characteristic, and a third classification weight based on third characteristic; and determining a first classification likelihood for the first text string based on the first classification weight, the second classification weight, and the third classification weight.

3. The method of claim 2, wherein determining the first classification likelihood for the first text string is further based on:

comparing the first text string to a first rule to determine a third characteristic for the first text string;

determining a value for the first rule; and determining the first classification weight based on the third characteristic and the value.

4. The method of claim 2, wherein comparing the first text string to the first plurality of text strings to determine the first characteristic for the first text string further comprises:

determining a number of matches between the first text string and other text strings in the first plurality of text strings; and determining the first characteristic based on the number of matches.

5. The method of claim 2, wherein comparing the first text string to the first plurality of text strings to determine the first characteristic for the first text string further comprises:

determining a first text string sequence in the first plurality of text strings, wherein the first text string sequence comprises the first text string and a second text string; and determining the first characteristic based on the first text string sequence.

6. The method of claim 2, wherein parsing the first text string to determine the second characteristic for the first text string further comprises:

determining a character length of the first text string; and determining the second characteristic based on the character length.

7. The method of claim 2, wherein parsing the first text string to determine the second characteristic for the first text string further comprises:

determining a number of different characters in the first text string; and determining the second characteristic based on the number of different characters.

8. The method of claim 2, wherein determining the first classification weight based on the first characteristic further comprises:

determining a frequency that a text string comprises the first characteristic; and determining the first classification weight based on the frequency.

9. The method of claim 2, further comprising:

retrieving a threshold classification likelihood for a first recommendation;

comparing the first classification likelihood to the threshold classification likelihood; and generating for display, on a user interface, the first recommendation based on comparing the first classification likelihood to the threshold classification likelihood.

10. The method of claim 9, wherein retrieving the threshold classification likelihood for the first recommendation further comprising:

determining a type of the first recommendation; and selecting the threshold classification likelihood based on the type.

11. The method of claim 2, further comprising:

receiving a second user record, wherein the second user record comprises a second plurality of text strings; and comparing the first text string to a second plurality of text strings to determine a third characteristic for the first text string.

12. The method of claim 2, further comprising:

receiving an aggregation of a plurality of user records, wherein the aggregation of the plurality of user records comprises a third plurality of text strings; and comparing the first text string to the third plurality of text strings to determine a fourth characteristic for the first text string.

13. The method of claim 2, wherein parsing the first plurality of text strings to identify the first text string in the first user record further comprises:

applying a first character filter to the first plurality of text strings to generate a filtered plurality of text strings; and parsing the filtered plurality of text strings.

14. The method of claim 2, wherein parsing the first plurality of text strings to identify the first text string in the first user record further comprises:

determining a respective text string category for each text string in the first plurality of text strings; and determining to parse the first text string based on the respective text string category for the first text string.

15. The method of claim 2, further comprising:

receiving a second user record, wherein the second user record comprises a second text string;

determining the first classification likelihood for the second text string; and generating for display, on a user interface, a recommendation based on determining the first classification likelihood for the first text string and the second text string.

16. One or more non-transitory, computer-readable mediums comprising instructions recorded thereon that when executed by one or more processors cause operations comprising:

parsing a first plurality of text strings to identify a first text string in a first user record;

comparing the first text string to the first plurality of text strings to determine a first characteristic for the first text string;

parsing the first text string to determine a second characteristic for the first text string;

comparing the first text string to a first rule to determine a third characteristic for the first text string;

determining a first classification weight based on the first characteristic, a second classification weight based on the second characteristic, and a third classification weight based on third characteristic; and determining a first classification likelihood for the first text string based on the first classification weight, the second classification weight, and the third classification weight.

17. The one or more non-transitory, computer-readable mediums of claim 16, wherein determining the first classification likelihood for the first text string is further based on comparing the first text string to a first rule to determine a third characteristic for the first text string;

determining a value for the first rule; and determining the first classification weight based on the third characteristic and the value.

18. The one or more non-transitory, computer-readable mediums of claim 16, wherein comparing the first text string to the first plurality of text strings to determine the first characteristic for the first text string further comprises:

determining a number of matches between the first text string and other text strings in the first plurality of text strings; and determining the first characteristic based on the number of matches.

19. The one or more non-transitory, computer-readable mediums of claim 16, wherein comparing the first text string to the first plurality of text strings to determine the first characteristic for the first text string further comprises:

determining a first text string sequence in the first plurality of text strings, wherein the first text string sequence comprises the first text string and a second text string; and determining the first characteristic based on the first text string sequence.

20. The one or more non-transitory, computer-readable mediums of claim 16, wherein parsing the first text string to determine the second characteristic for the first text string further comprises:

determining a character length of the first text string; and determining the second characteristic based on the character length.

* * * * *